United States Patent [19]

Pore

[11] Patent Number: 4,791,424
[45] Date of Patent: Dec. 13, 1988

[54] DOPPLER RADAR KINEMOMETER

[75] Inventor: Jacques Pore, Eaubonne, France

[73] Assignee: Jeumont-Schneider Corporation, Puteaux cedex, France

[21] Appl. No.: 586

[22] Filed: Jan. 6, 1987

[30] Foreign Application Priority Data

Jan. 15, 1986 [FR] France ............................ 86 00497

[51] Int. Cl.$^4$ .............................................. H01Q 1/32
[52] U.S. Cl. ...................................... 343/711; 343/879; 342/117
[58] Field of Search .................. 343/711, 712–715, 343/879; 342/111, 112, 113, 117

[56] References Cited

U.S. PATENT DOCUMENTS

| 3,480,954 | 11/1969 | Gray et al. | 342/117 |
|---|---|---|---|
| 3,859,660 | 1/1975 | Augustine et al. | 342/117 |
| 3,893,076 | 7/1975 | Clifford | 342/117 |
| 4,050,071 | 9/1977 | Clorfeine | 342/117 |
| 4,107,680 | 8/1978 | Kaplan | 342/117 |
| 4,148,028 | 4/1979 | Fujiki | 342/113 |
| 4,414,548 | 11/1983 | Carpenter et al. | 342/117 |
| 4,517,566 | 5/1985 | Bryant et al. | 342/117 |
| 4,658,257 | 4/1987 | Izutemi et al. | 342/117 |

Primary Examiner—William L. Sikes
Assistant Examiner—Doris J. Johnson
Attorney, Agent, or Firm—Rines and Rines Shapiro and Shapiro

[57] ABSTRACT

The invention concerns a Doppler radar kinemometer intended to measure the speed of a railway vehicle. According to the invention, it includes two antennas (1,2) mechanically connected to one another such that their axes form a determined angle between them. This angle is preferably between 60° and 120°. For safety operation, the antennas are each supplied with ultrahigh frequency waves (F1,F2) by their own wave generators (4,5), and each furnishes corresponding Doppler frequencies (Fd1,Fd2) to a distinct processing unit (11,12), with the signals coming from these two processing units then processed within a computing assembly (15) which supplies the value of the measured velocity.

11 Claims, 1 Drawing Sheet

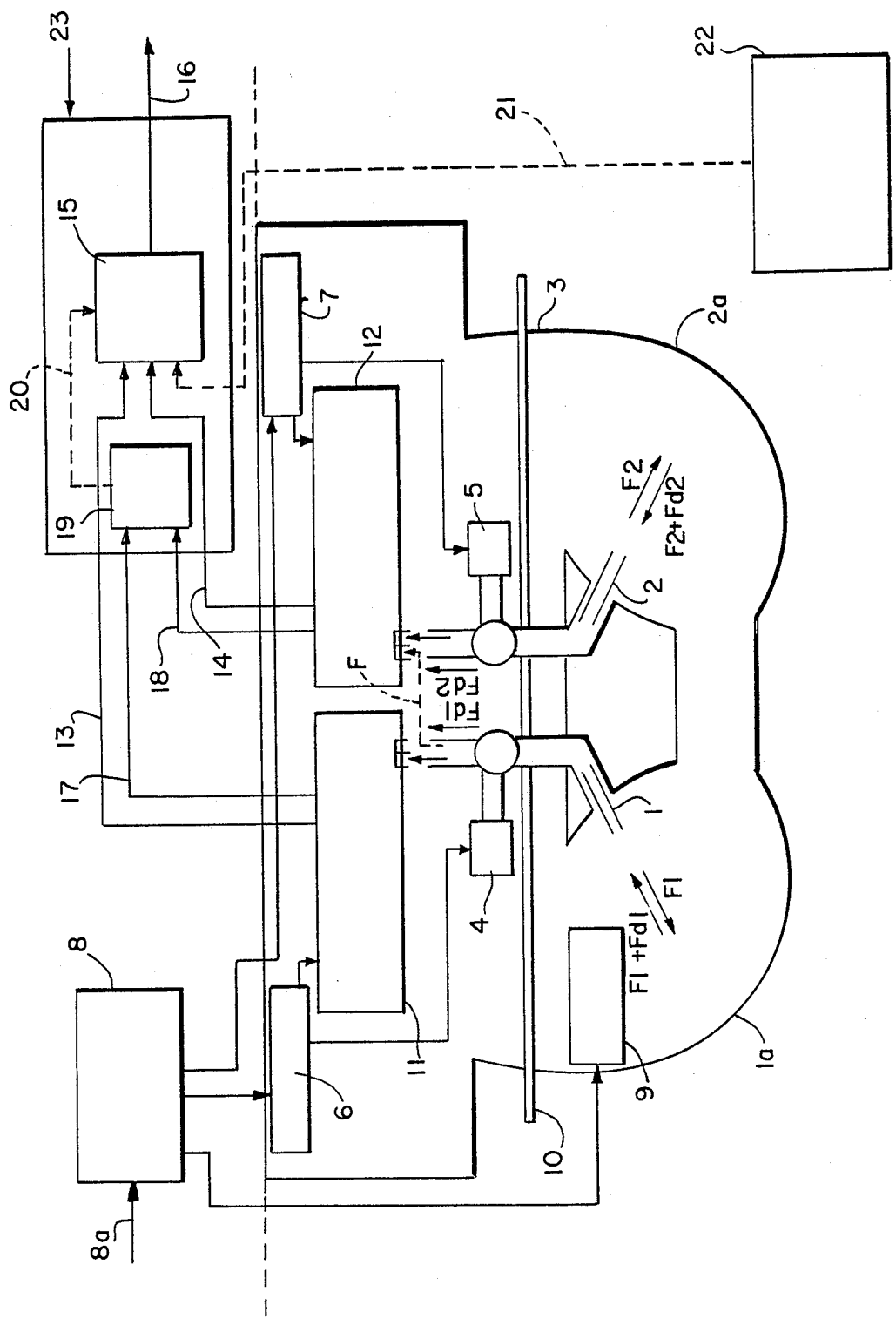

DOPPLER RADAR KINEMOMETER

The present invention concerns a Doppler radar kinemometer, intended to measure the speed of a railway vehicle.

The principle of such apparatus, utilized especially to monitor the speed of automobiles on highways, is well known: a transmitter-receiver of ultrahigh frequency radio waves, with a single directional antenna, projects monochromatic waves, which return when they strike an obstacle. The difference in frequency between the emitted waves and the reflected waves, due to the Fizeau-Doppler effect, corresponds to the relative velocity of the obstacle at the time of measurement.

However, the determination of velocity by means of these familiar devices is hampered by a certain number of causes of error, such as, for example, the fact that the emitted waves are not rigorously monochromatic, or that geometric perturbations can intervene, the ground or the rail not being an ideal reflector. Moreover, these devices do not make it possible to know the direction of displacement of the vehicle, which must necessarily be known if it is desired that automatic control equipment be put into use. Nor is it possible to perform a safe speed measurement, which is indispensible in the case of certain railway applications, for example.

It is in addition the object of the present invention to furnish a Doppler effect "safety" kinemometer, whose precision is clearly superior to that of familiar apparatus, without its cost being prohibitive.

Summarizing the invention, this object and others which will appear below, are achieved by virtue of a radar kinemometer characterized by the fact that it includes two antennas connected mechanically to one another, whose axes form a given angle to one another. This angle is preferably between 60° and 120°.

Toward the goal of realizing a "safety" railway system (that is, one such that any failure results in a more restrictive state), the invention is built around two processing chains, presenting a maximum of totally independent elements, with a view to the elimination of so-called common mode failures.

Thus, the antennas are each supplied with ultra high frequency waves by their own wave generators, each supplying corresponding reflected waves to a different processing unit, with the signals coming from the two processing units then being processed within a computing assembly, which provides the value of the measured velocity.

Those skilled in the art will easily comprehend that this arrangement results in knowledge of the direction of movement, and attainment of a measurement precision clearly greater than that obtained by means of apparatus including only a single antenna, so that the precision of placement of the case of the apparatus and of the receptor is no longer as critical, and they can usefully be installed aboard a railway vehicle.

Preferably, the opening angle of the lobe of the ultrahigh frequency waves of each of the antennas specified above is between 5° and 8°, and advantageously is near 5.5°, this constituting a satisfactory compromise between large angles corresponding to a high imprecision, and small angles leading to antennas with excessively large dimensions.

Within an advantageous embodiment of the invention, each of the two antennas in question is a simple cavity parabola, functioning in the area of 24 GHz, for reasons which will be explained below.

To ensure the safety functioning of the kinemometer, the frequencies of the two wave generators are different, and sufficiently separated so as to avoid any interaction of the ultrahigh frequency signals of the two chains in the case of a disturbance, whatever its nature (for example, variations in temperature, variations due to processing, due to filtering, etc.) For example, it is possible to utilize two ultrahigh frequency sources with frequencies differing by 2%.

The processing units of each chain are preferably also as physically independent as possible (materials, components, printed circuits).

Moreover, to obtain assurance of the origin of transmitted messages, the specified computing assembly receives two characteristic signals, each from one of the processing units, and, if applicable, signals emitted from a complementary velocity measurement, device such as a coded phonic wheel, for example.

It is also disadvantageous for each of the two processing units to be supplied with electric current from a different converter, which further improves the electronic separation between the two antennas and the circuits corresponding to each of them.

Finally, the case in which the antennas are emplaced can also include a heating mechanism to maintain the antennas at the desired temperature, and/or a radioelectric shield between the antennas and the electronic apparatus contained in the case, to prevent the reflected waves from disturbing their operation.

The description which follows, which is in no way limitational, will enable better understanding of how the present invention may be put into practice. It is to be read with reference to the single appended figure, which represents a schematic of the principle of the radar kinemometer according to the invention, principally in block form.

DETAILED DESCRIPTION

As is seen in the FIGURE, the kinemometer includes two radar antennas 1 and 2, which are connected mechanically to one another, and which are installed in two radomes, 1a and 2a respectively, which are part of a case 3. The axes of these antennas form a significant angle between them, preferably between 60° and 120°. The antenna 1 is supplied with ultrahigh frequency waves of frequency F1 from a generator 4, and the antenna 2 is supplied with ultrahigh frequency waves of frequency F2 from a different generator 5, both of these two generators functioning in the area of 24 GHz.

Preferably, the antennas 1 and 2 present a lobe opening angle between 5° and 8°. It is known, in fact, that a large opening angle leads to a much greater imprecision, while a small angle leads to an excessively large diameter. According to a specific example of realization, a value of 5.5°, for a diameter of 165 mm, has been retained.

Advantageously, each of the antennas 1 and 2 is a parabola. A horn would lead to an antenna of excessively large dimensions, and plates would lead to an antenna which would be difficult to utilize industrially, and would be especially costly. The invention therefore proposes the utilization of a parabola which is excited at its focus by a dipole of the "quarter wave" type. With the diameter indicated above, this leads to a theoretical gain in the neighborhood of 30 dB, and a secondary lobe level less than or equal to −15 dB with respect to that of the principal lobe.

It is advantageous that the antennas 1 and 2 be simple fixed frequency cavity antennas, such being markedly less costly than cavities adjustable in frequency by an external control.

Finally, the frequency of operation of the antennas 1 and 2, around 24 GHz, has been chosen because it furnishes a better precision for given dimensions and environmental conditions, a better ground reflectivity, and smaller antenna dimensions than, for example, frequencies around 9 or 10 GHz.

Also, to further improve the mechanical rigidity of the illuminating dipoles, it is highly desirable to confine them within a wave-permeable plastic foam. This arrangement enables a precise centering of the radiating lobes, and in large proportion limits the microphonic phenomena due to the vibrations of the antennas with respect to their respective radomes.

Secondary converters 6 and 7, housed within the case 3, furnish the generators 4 and 5 respectively with the electrical voltages they require, for example 5 and 12 volts, from a common primary converter 8 outside of the case 3, which furnishes a service voltage and is connected through a line 8a to a power source which is not represented. Finally, a heating mechanism 9 housed in the case 3 provides the heat necessary to maintain the antennas at a given constant temperature, and a shield 10 protects the electronic apparatus contained in the case 3 against parasitic radioelectric waves which could affect their performance.

The Doppler frequencies Fd1 and Fd2 of the reflected waves received respectively by antennas 1 and 2, are conducted to two processing units 11 and 12 respectively, situated within the case 3. The processing units are supplied with electric current by the secondary converters 6 and 7 respectively, and deliver signals over lines 13 and 14, corresponding to the frequencies Fd1 and Fd2, which signals are transmitted to a computing assembly 15, outside of the case 3. The computing assembly 15 furnishes the relative velocity of the obstacle encountered, and transmits the value of this velocity, through a line 16, to a display device, not represented, or to an automatic piloting device. The assembly 15 can also receive signals via lines 17 and 18, characterizing respectively the processing units 11 and 12, through the intermediary of a module 19 and a line 20, and, if applicable, signals emanating, through a line 21, from a coded phonic wheel 22, with which the railway vehicle is equipped in classical fashion, so as to obtain redundant vehicle sufficient speed information, for example above 1 cm/s, and to verify the precision of measurement at very low vehicle speed. Finally, a line 23 supplies electrical current to the computation assembly 15 and the module 19.

The generators 4 and 5, the processing units 11 and 12, the computing assembly 15, the module 19, and the converters 6, 7, and 8 are of classical type, and well known to those skilled in the art, and thus will not be described in detail herein.

The kinemometer according to the invention, in a version not implemented as a "safety" measure (that is, not implemented in such a fashion that any failure results in a more restrictive state), obviously permits processing of the information received from the two antennas 1 and 2 by a single processing unit 12 (arrow F).

Although only a single preferred mode of embodiment of the invention has been described, it is obvious that any modification introduced within the same spirit shall not constitute a departure from the framework of the invention as claimed.

What is claimed is:

1. A Doppler radar kinemometer, comprising a first Doppler radar antenna and a second Doppler radar antenna mechanically connected to one another with respective axes thereof at a predetermined angle between 60° and 120°; a first wave generator and signal processor assembly connected to said first antenna; a second wave generator and signal processor assembly independent of said first assembly and connected to said second antenna; the wave generator of said first assembly supplying ultrahigh frequency first waves of a first predetermined frequency to said first antenna, and said signal processor of said first assembly receiving the Doppler frequency of said first waves as received by said first antenna; the wave generator of said second assembly supplying ultrahigh frequency second waves of a second predetermined frequency different from said first frequency to said second antenna, and said signal processor of said second assembly receiving the Doppler frequency of said second waves as received by said second antenna; each said signal processor providing an output representing the corresponding Doppler frequency; and a computer connected to said signal processors and calculating velocity based on the respective outputs thereof.

2. Radar kinemometer according to claim 1, unique in that each said antenna is configured such that the opening angle of the lobe of the ultrahigh frequency waves thereof is between 5° and 8°.

3. Radar kinemometer according to claim 1, unique in that each of said antennas is a parabolic, fixed-frequency cavity antenna.

4. Radar kinemometer according to claim 1, unique in that the computer receives in addition signals emitted by a coded phonic wheel.

5. Radar kinemometer according to claim 1, unique in that the computer receives in addition signals characterizing the respective processing units.

6. Radar kinemometer according to claim 1, unique in that each of the two processing units is supplied with electric current by a corresponding separate converter.

7. Radar kinemometer according to claim 1, unique in that said antennas and said wave generator and signal processor assemblies are housed together within a single case.

8. Radar kinemometer according to claim 7 unique in that the said case includes a heating mechanism which maintains temperature within said case.

9. Radar kinemometer according to claim 7 unique in that said case includes a radioelectric shield interposed between the said antennas and said wave generator and signal processor assemblies.

10. Radar kinemometer according to claim 2 unique in that said opening angle is about 5.5°.

11. Radar kinemometer according to claim 1 unique in that said first and second predetermined frequencies differ by about 2%.

* * * * *